(12) United States Patent  (10) Patent No.: US 6,520,579 B2
Kassai et al.  (45) Date of Patent: Feb. 18, 2003

(54) VEHICULAR CHILD SAFETY SEAT

(75) Inventors: Kenzou Kassai, Osaka (JP); Hiroyasu Yamamoto, Osaka (JP)

(73) Assignee: Aprica Kassai Kabushikikaisha, Osaka (JP)

( * ) Notice: Subject to any disclaimer, the term of this patent is extended or adjusted under 35 U.S.C. 154(b) by 0 days.

(21) Appl. No.: 09/906,628

(22) Filed: Jul. 16, 2001

(65) Prior Publication Data

US 2001/0048237 A1 Dec. 6, 2001

(51) Int. Cl.[7] .................................................. A47D 1/10
(52) U.S. Cl. ............................ 297/256.12; 297/344.22; 297/344.21
(58) Field of Search ....................... 297/250.1, 256.12, 297/256.13, 256.1, 256.14, 344.21, 344.22, 344.24, 344.25; 248/131, 415, 416; 296/65.01

(56) References Cited

U.S. PATENT DOCUMENTS

| | | | | |
|---|---|---|---|---|
| 3,113,804 A | * | 12/1963 | Ritter | 297/344.24 X |
| 3,572,817 A | * | 3/1971 | Colautti | 297/344.22 X |
| 3,821,825 A | * | 7/1974 | Bailey | 297/344.24 X |
| 4,168,050 A | * | 9/1979 | Nerem et al. | 297/344.22 X |
| 4,762,364 A | * | 8/1988 | Young | 297/256.13 X |
| 6,241,314 B1 | * | 6/2001 | Pufall | 297/256.12 |
| 6,283,545 B1 | * | 9/2001 | Ernst | 297/256.12 X |

FOREIGN PATENT DOCUMENTS

| | | |
|---|---|---|
| JP | 63-98838 | 6/1988 |
| JP | 2000 108739 | 4/2000 |
| JP | 2001-180349 | 7/2001 |

* cited by examiner

*Primary Examiner*—Peter M. Cuomo
*Assistant Examiner*—Stephen Vu
(74) *Attorney, Agent, or Firm*—W. F. Fasse; W. G. Fasse (57) ABSTRACT

A child seat includes a seat body, a base, and a mechanism for simultaneously sliding the seat body forward as the seat body is rotated relative to the base. This rotation sliding mechanism includes a cam plate connected to the seat body and an abutting plate connected to the base. When the seat body is in a forward-facing position, one side of the cam plate is entirely abutted against the abutting plate. When the cam plate is rotated by 45°, the cam plate moves toward the front while a corner of the cam plate abuts against the abutting plate. With this structure, the child seat has enhanced securing stability relative to a vehicle seat and can facilitate in-vehicle handling.

8 Claims, 8 Drawing Sheets

AFTER ADDITIONAL 45° ROTATION

# VEHICULAR CHILD SAFETY SEAT

BACKGROUND OF THE INVENTION

1. Field of the Invention

The present invention relates to vehicular child safety seats which are secured to a vehicle seat by a seat belt of a vehicle seat. More specifically, the present invention relates to a structure of a vehicular child safety seat capable of providing enhanced securing stability relative to a vehicle seat and facilitating in-vehicle handling.

2. Description of the Background Art

If a conventional vehicular child safety seat (hereinafter referred to as a child seat) has a mechanism in which a support surface for supporting a child is rotatable, the support surface is rotated with the child seat secured to a vehicle seat. Thus, for the purpose of preventing a backrest of the support surface from interfering the vehicle seat (especially, a backrest of the vehicle seat) when the support surface rotates, the backrest is adapted to incline largely forward. Alternatively, the support surface is designed to provide a prescribed distance between the backrest of the child seat and the backrest of the vehicle seat, taking into account a rotating radius of the backrest of the child seat.

However, the former alternative requires a complicated mechanism. In addition, for rotation of the support surface, the backrest must incline forward. As a result, in-vehicle operation becomes complicated.

The latter alternative is accompanied by a problem that the mounting of the child seat to the vehicle seat may become unstable because of the prescribed distance between the backrests of the child seat and the vehicle seat.

SUMMARY OF THE INVENTION

An object of the present invention is to provide a child seat capable of providing enhanced securing stability relative to a vehicle seat and facilitating in-vehicle handling.

The child seat of the present invention has a base portion which is secured to a vehicle seat by a seat belt of the vehicle seat, and a support portion forming a support space for receiving a child and rotatably supported by the base portion. The child seat is further provided with a rotation sliding mechanism including a cam member provided in the support portion and an abutting plate provided in the base portion and abutting the cam member for sliding the support portion in forward and backward directions of the base portion with rotation of the support portion.

Thus, the rotation sliding mechanism causes the support portion to move forward during rotation of the support portion, so that the problem of the interference to the vehicle seat during rotation of the support portion is eliminated. Accordingly, the child seat can be designed such that the position of the support portion is close to the backrest of the vehicle seat. As a result, the child seat can be provided with enhanced securing stability relative to the vehicle seat.

Further, unlike the conventional case, rotation of the support portion can be made without having to incline a part which forms the support portion, e.g., the backrest. Thus, in-vehicle handling of the child seat can be facilitated.

To implement the above described invention in a more preferable manner, the following structure is employed. The rotation sliding mechanism is provided with a guide frame which is provided in the base portion for slidably guiding the supporting portion in upward and backward directions, where the cam member has a rectangular outer surface.

Since the cam has the rectangular outer surface, one of corners of the cam is abutted against the abutting plate as the support portion rotates, whereby the support portion is moved forward with rotation. Further, if the cam is rotated beyond a diagonal line, the support portion is moved backward with rotation.

Accordingly, the support portion can smoothly rotate from the back side to the front side, and vice versa.

Preferably, a bias portion is provided between the base portion and the support portion to apply to the support portion a force toward the back side of the base portion. The provision of the bias portion causes the support portion to be readily rotated by the bias force of the bias portion when the support portion moves from the front side to the back side of the support member.

More preferably, a locking portion is provided between the base portion and the support portion for fixing the position of the support portion relative to the base portion. The provision of the locking portion ensures that the support portion is secured to the base when the child seat is used in a vehicle, whereby a higher level of in-vehicle safety is provided when the child seat is used.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7 to 9 are respectively first to third sectional views each showing a locking mechanism.

DESCRIPTION OF THE PREFERRED EMBODIMENTS

Now, a structure of a child seat according to an embodiment of the present invention will be described with reference to the drawings.

Figure 1:
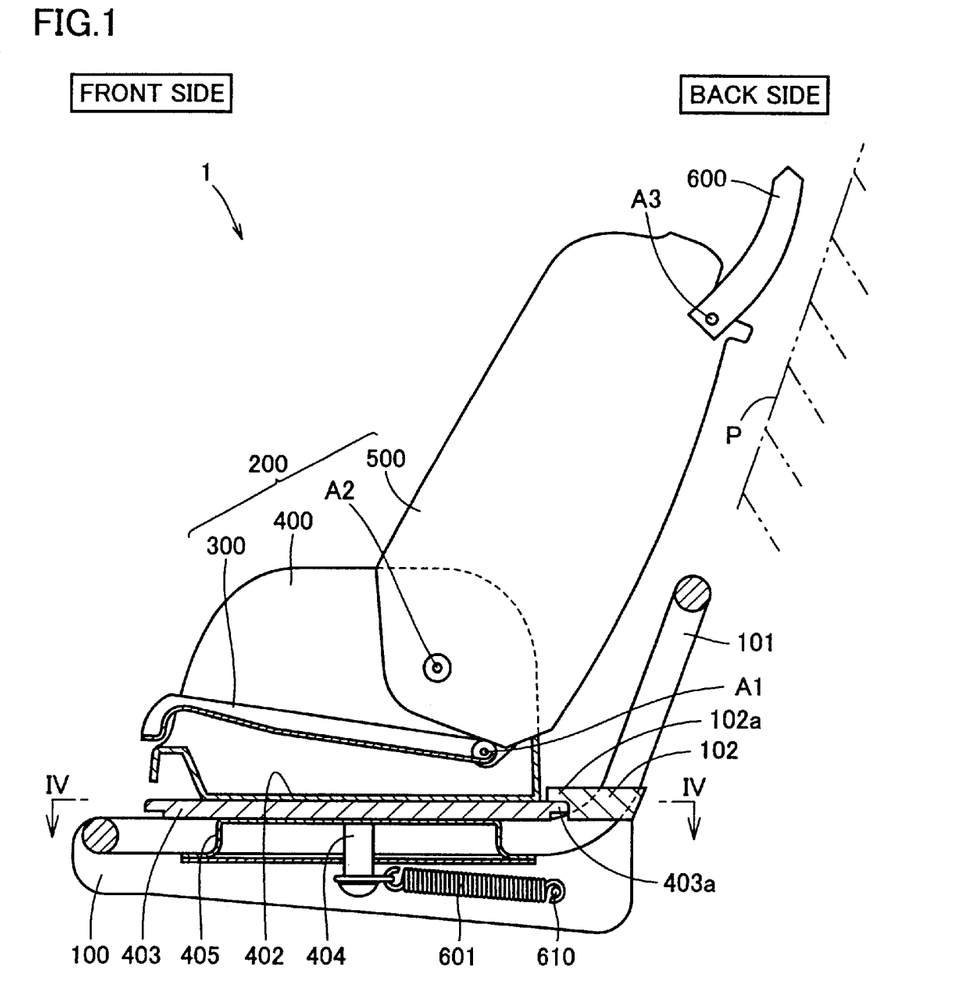
FIGS. 1 to 3 are vertical sectional views schematically showing a structure of a child seat 1, respectively in first to third positions of an to embodiment of the present invention.
Figure 4:
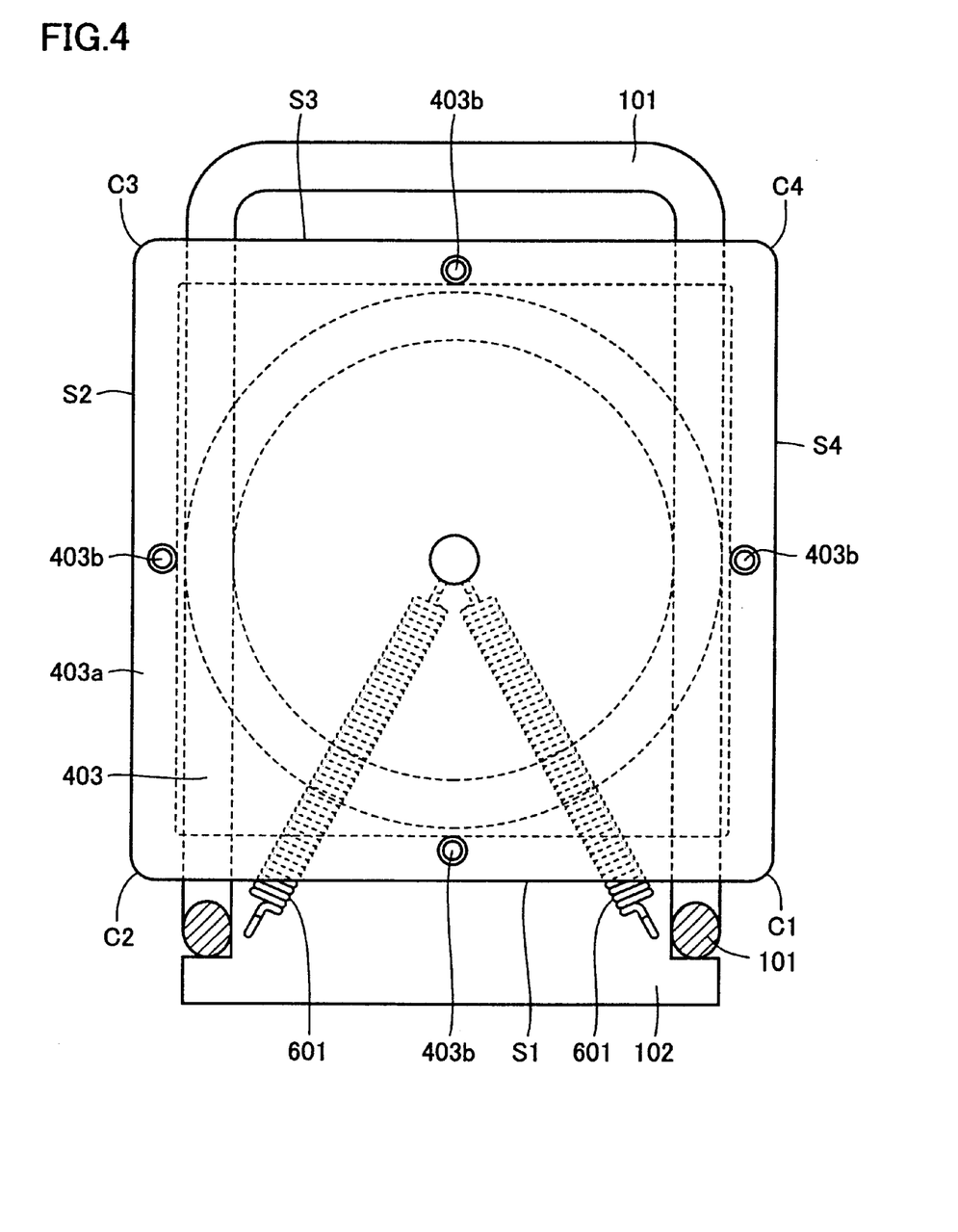
FIG. 4 is a sectional view taken along the line IV—IV of FIG. 1, showing a first diagram in conjunction with an operation of a rotation sliding mechanism.

First of all, referring to FIGS. 1 and 4, a general structure of a child seat 1 of the present embodiment will be described. Note that FIG. 1 is a vertical sectional view showing child seat 1 secured to a vehicle seat by a seat belt (not shown). FIG. 4 is a sectional view taken along the line IV—IV of FIG. 1.

Structure of Child Seat 1

Referring to FIG. 1, child seat 1 has a seat body 200 of a support portion forming a support space for receiving a child, and a base 100 for supporting seat body 200 to be rotatable generally in the horizontal direction and slidable between the front side and the back side.

Seat body 200 has a seat portion 300, a pair of side arms 400, a backrest 500 provided with a pair of side walls, and a headrest 600. Seat portion 300 and backrest 500 are rotatably connected by a shaft Al in such a way that seat portion 300 is slidable toward the front side cooperatively with a reclining operation of backrest 500. The pair of side arms 400 are connected by connecting base 402. Backrest 500 is rotatably connected to side arms 400 by a shaft A2 in a reclinable manner. Headrest 600 is rotatably connected to the upper end of portion of backrest 500 by a shaft A3.

Base 100 is provided with a guide frame 101 on the back side which forms a generally upright standing wall. As shown in FIGS. 1 and 4, guide frame 101 surrounds a guide disk 405 below seat portion 300 and is movable toward the front and back sides.

As shown in FIG. 4, a cam plate 403, generally in a rectangular shape, is secured to the bottom surface of seat portion 300. Guide disk 405 is secured to the bottom surface of seat portion 300 with cam plate 403 and guide disk 405 vertically sandwiching guide frame 101 therebetween.

On the back side of cam plate 403, as shown in FIG. 1, an edge 403a of cam plate 403 is secured to guide frame 101, and a protruding piece 102a of an abutting plate 102 mounted to guide frame 101 is provided to cover edge 403a of cam plate 403.

A coil spring 601 for applying a force toward the back side of seat portion 300 is provided between the bottom surface of seat portion 300 and seat base 100. As shown in FIG. 4, two such coil springs 601 are provided in a V-like shape, where one end of coil spring 601 being fixed to a support shaft 404 at the middle of the bottom surface of seat portion 300, and the other end of coil spring 601 being fixed to a support pin 610 in the seat base 100.

A locking mechanism for suppressing rotation of seat body 200 to fix the normal position is provided between abutting plate 102 and cam plate 403. The locking mechanism will be described afterwards.

Rotating and Reclining Operations of Child Seat 1

Figure 2:
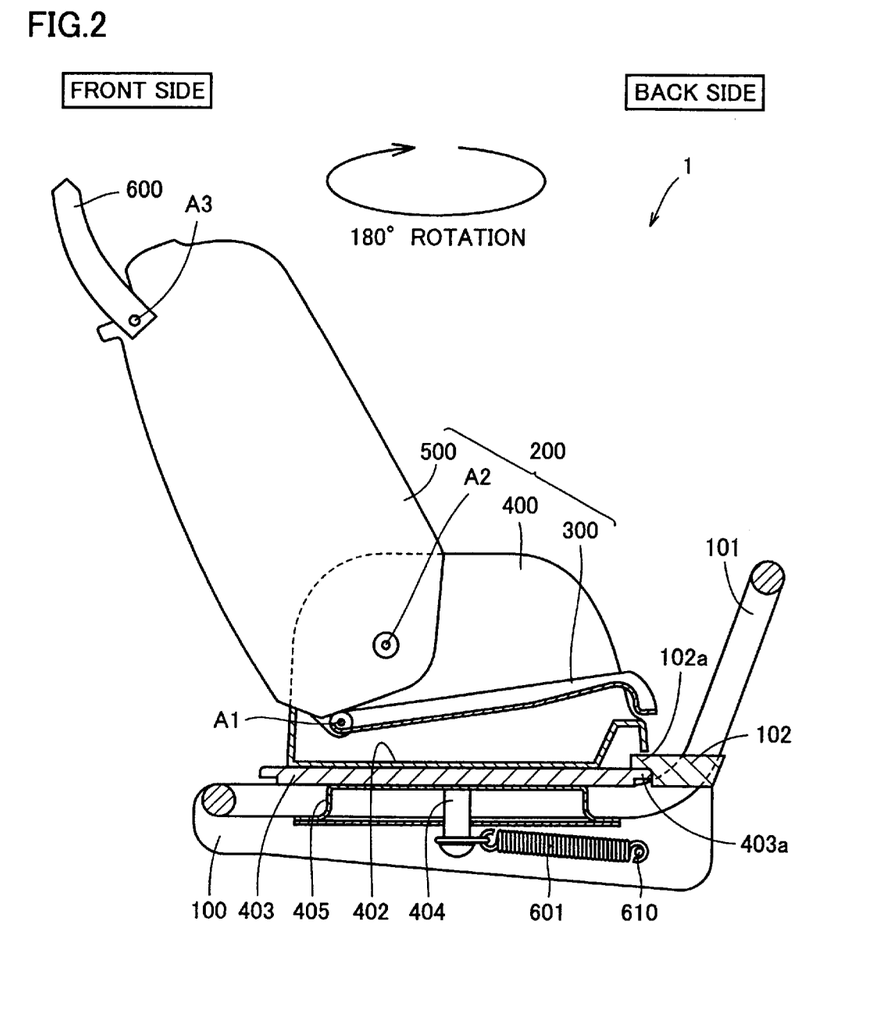
Figure 3:
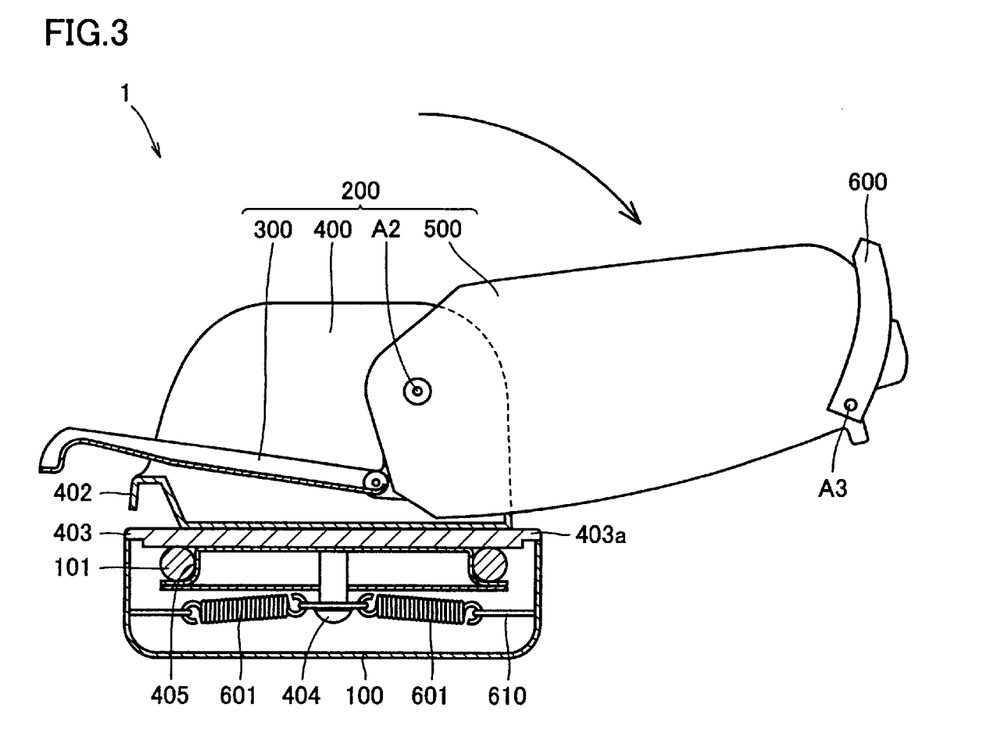

Now, rotating and reclining operations of child seat 1 will be described with reference to FIGS. 2 and 3. FIG. 2 shows seat body 200 of the child seat reclined toward the travel direction of a vehicle, with seat body 200 rotated by 180° relative to FIG. 1. Except that seat body 200 faces the back side, the figure is the same as FIG. 1.

Because of the importance to lay down an infant in a vehicles particularly a newborn infant and baby, this child seat 1 makes it possible to form a bed with seat body 200 by fully reclining backrest 500. When the bed is formed with seat body 200, seat body 200 is rotated by 900 for use while facing or extending in the direction orthogonal to the travel direction of the vehicle, because of in-vehicle space limitations, as shown in FIG. 3.

Rotation Sliding Mechanism

Now, the specific structure of the rotation sliding mechanism for rotating child seat 1 will be described with reference to FIGS. 4 to 6.

In FIG. 4, seat body 200 is fully on the back side, where one side S1 of cam plate 403 is entirely in contact with abutting plate 102.

Figure 5:
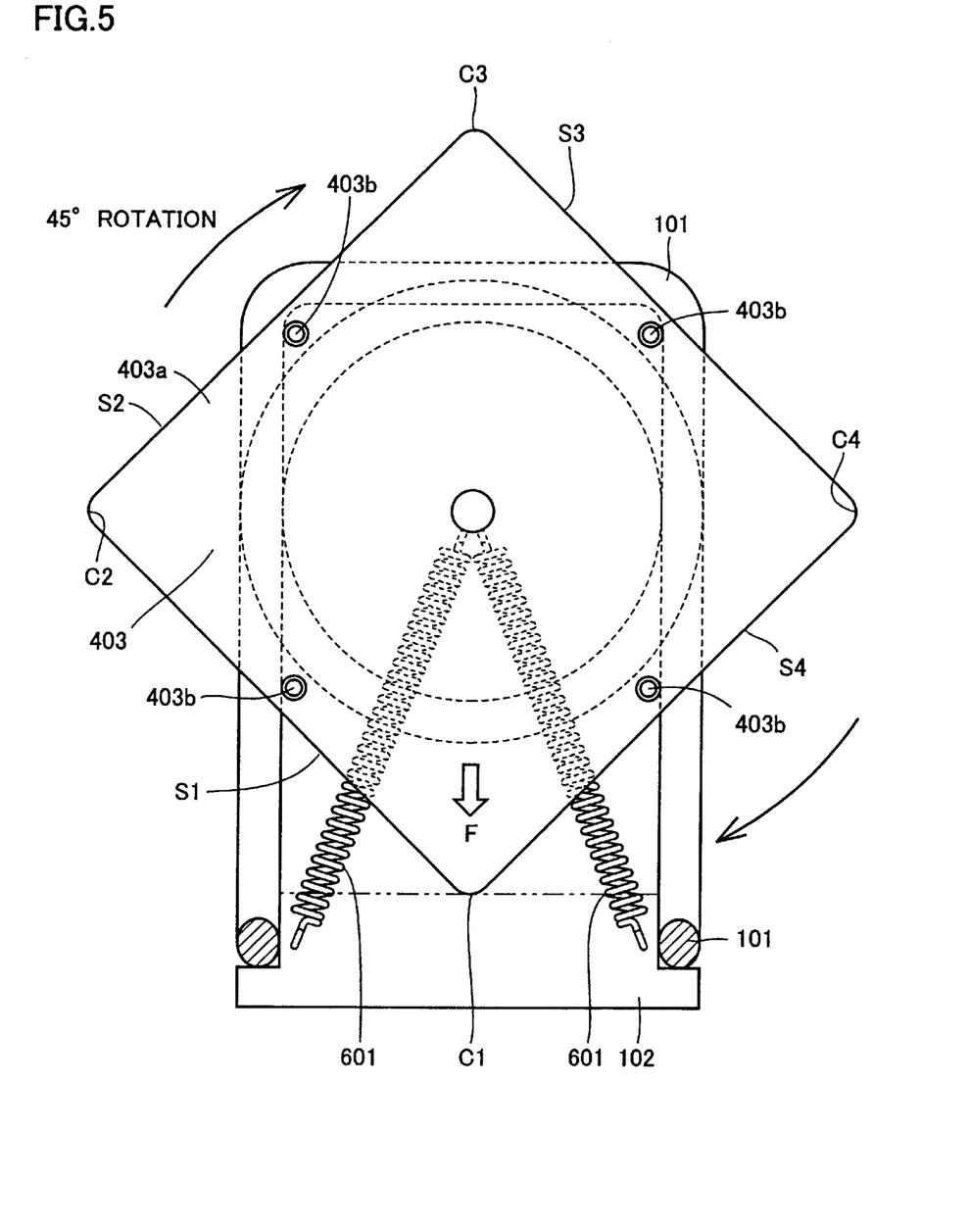
FIG. 5 is a second diagram shown in conjunction with the operation of the rotation sliding mechanism.

Next, referring to FIG. 5, when seat body 200 is rotated clockwise by 45°, a corner C1 of four corners of cam plate 403 moves toward the left side from the right side in the drawing with rotation of seat body 200 while being abutted against abutting plate 102. The movement of corner C1 from the right side to the left side causes cam plate 403 to move toward the front side as being guided by a guide disk 405 with guide frame 101. If cam plate 403 is rotated clockwise by 45°, it is fully moved toward the front side. In addition, coil spring 601 is fully stretched to apply force F to cam plate 403 to constantly pull it toward the back side.

Figure 6:
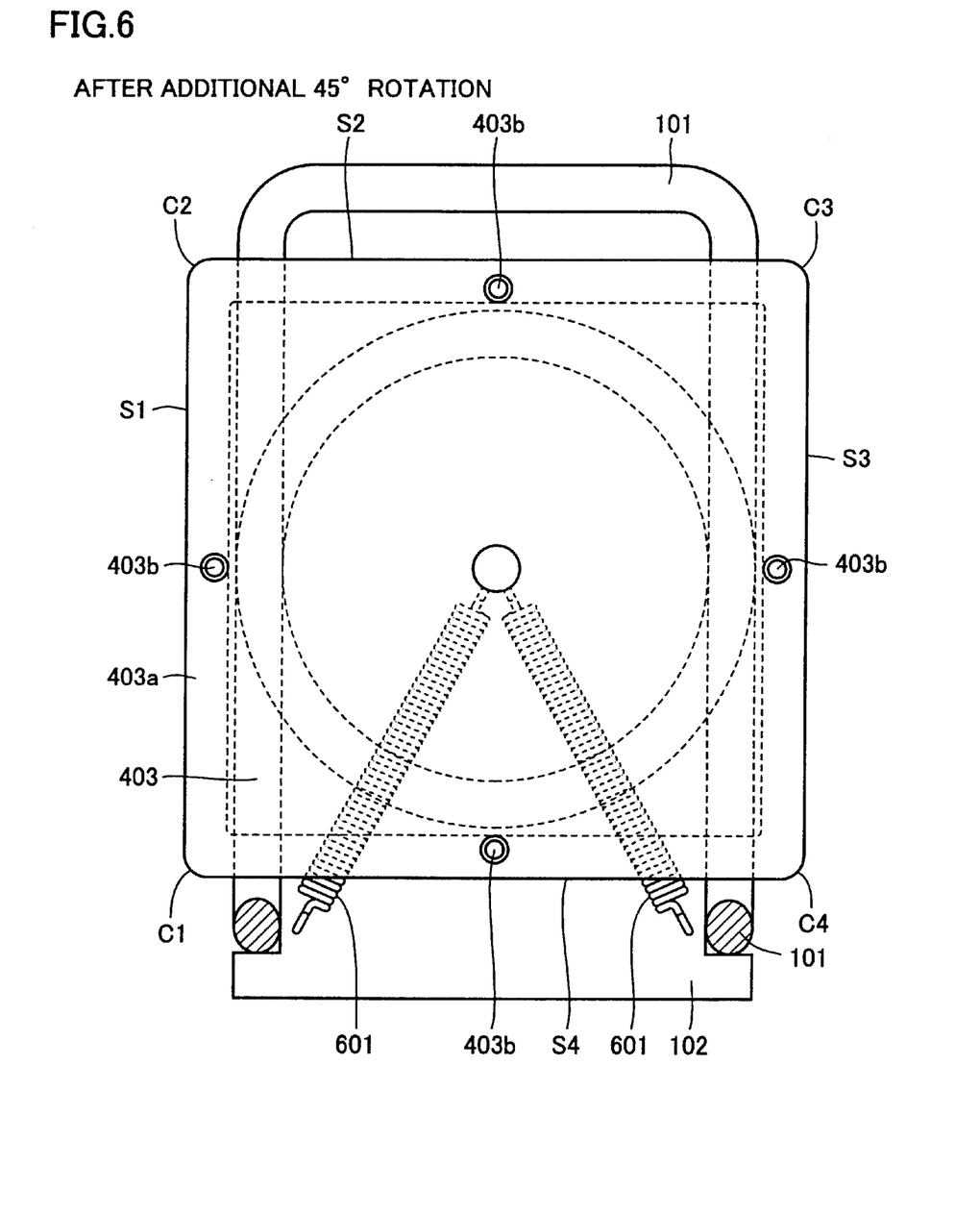
FIG. 6 is a third diagram shown in conjunction with the operation of the rotation sliding mechanism.

Next, referring to FIG. 6, when seat body 200 is further rotated, force F of coil spring 601 readily returns seat body 200 back to the position on the back side. This completes 90° rotation of seat body 200. When seat body 200 is further rotated, sides S2 to S4 as well as corners C2 to C4 act as side S1 and corner C1.

Thus, during rotation of seat body 200, the rotation sliding mechanism moves seat body 200 toward the front side, so that seat body 200 would not interfere the vehicle seat when it is rotated.

Thus, as shown in FIG. 1, a child seat can be designed such that seat body 200 and backrest P of the vehicle seat are positioned close to each other.

In rotating seat body 200, an operation of e.g., reclining backrest 500 of seat body 200 toward the front side or the like, is not required for rotating seat body 200. Thus, in-vehicle handling of the child seat is facilitated.

Locking Mechanism

Now, referring to FIG. 6 and FIGS. 7 to 9, locking mechanisms provided in abutting plate 102 and cam plate 403 for preventing rotation of seat body 200 will be described. As shown in FIG. 6, cam plate 403 has locking holes 403b in the regions near the middle portion of sides S1 to S4, respectively.

Figure 7:
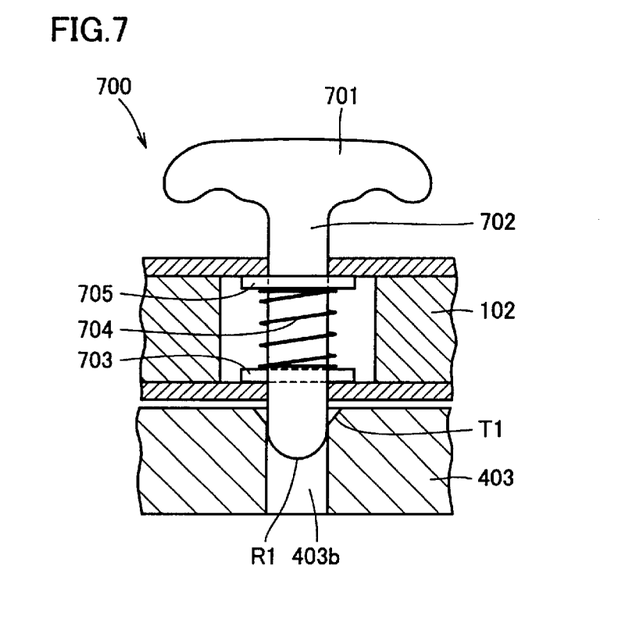

On the other hand, abutting plate 102 has locking mechanism 700 to be inserted into locking holes 403b. Locking mechanism 700 has a locking pin 702 to be inserted into locking hole 403b, and a handle 701 for operating locking pin 702.

Locking pin 702 has a coil spring 704 for constantly applying a force in the direction of inserting into locking hole 403b. The upper end of coil spring 704 is secured to abutting plate 102 through an upper plate 705, whereas the lower end of coil spring 704 is secured to locking pin 702 through a lower plate 703.

Figure 8:
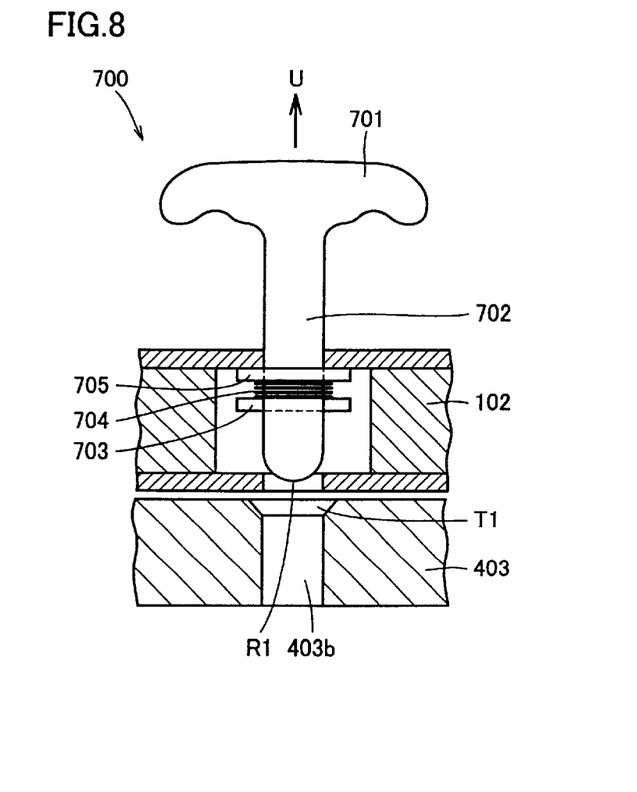

FIG. 7 shows locking pin 702 inserted into locking hole 403b, where rotation of seat body 200 is prevented. On the other hand, FIG. 8 shows that handle 101 is pulled upward (U direction) to release locking pin 702 out of locking hole 403b, so that rotation of seat body 200 is enabled. shape R1, and the upper end portion of locking hole 403b preferably has a taper T1.

Figure 9:
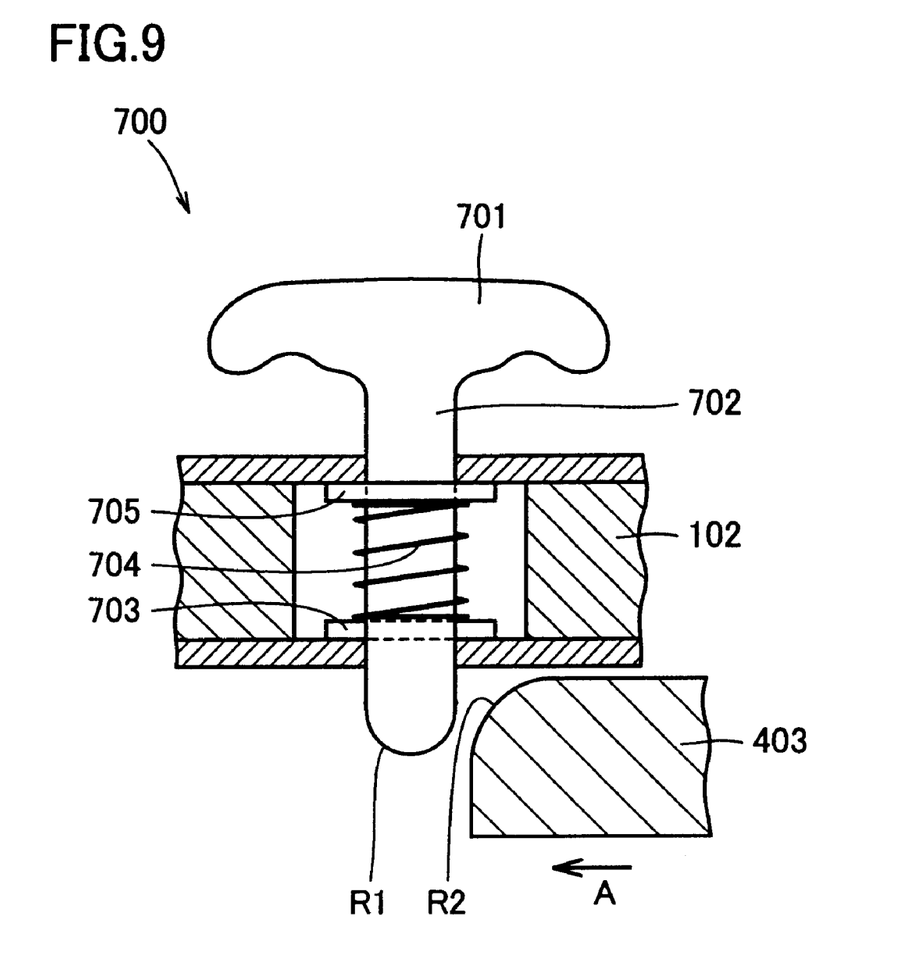

In the case where locking pin 702 is pulled out from cam plate 403 during rotation of seat body 200 as shown in FIG. 9 and then cam plate 403 is further rotated, the upper side of the end surface portion of cam plate 403 is preferably molded to have a curved shape R2, so that locking pin 702 can be readily inserted to cam plate 403.

As in the foregoing, in child seat 1 of the present embodiment, the rotation sliding mechanism causes seat body 200 to move toward the front side during rotation of seat body 200, so that the problem of the interference to the vehicle seat during rotation of seat body 200 is eliminated.

Thus, as shown in FIG. 1, the child seat can be designed such that the positions of seat body 200 and backrest P of the vehicle seat are close to each other.

When rotating seat body 200, for example, backrest 500 of seat body 200 needs not be reclined toward the front side for rotating seat body 200. Thus, in-vehicle handling of child seat 1 is facilitated.

It is noted that the above described configuration, rotation sliding mechanism, and locking mechanism of child seat 1 are not limited to those of the present embodiment. For example, the shape of cam plate 403 does not necessarily have to be rectangular, but any two pairs of mutually opposite sides may be provided. Other appropriate shapes are also possible as necessary.

Further, the arrangement of coil spring 601 is not limited to those shown in FIGS. 4 to 6, and various other arrangements are possible. In addition, other elastic members such as a rubber and leaf spring may be used in place of coil spring 601 if such member has the same function.

According to the child seat of the present invention, the rotation sliding mechanism causes the support portion to move toward the front side when the support portion is rotated, whereby the problem of the interference to the vehicle seat when the support portion is rotated is eliminated. Thus, the child seat can be designed such that the support portion is positioned close to the backrest of the vehicle seat. As a result, the child seat has enhanced securing stability to the vehicle seat. Further, the support portion can be rotated without having to recline the backrest forming the support portion toward the front side as in the conventional case, for example, in-vehicle handling of the child seat can be facilitated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A child safety seat adapted to be arranged on a vehicle seat in a vehicle and to be secured to the vehicle seat by a seat belt of the vehicle, said child safety seat comprising:

a base adapted to be supported on the vehicle seat and to be secured to the vehicle seat by the seat belt;

a seat body adapted to have a child seated therein, wherein said seat body is rotatably and slidably mounted on said base;

a cam member comprising a cam plate that has a peripheral cam surface, and that is secured to a bottom of said seat body; and an abutting member comprising an abutting plate that abuts against said peripheral cam surface of said cam plate, and that is secured to said base;

wherein said peripheral cam surface has a cam shape with a varying radial distance from a center of said cam plate to various points along said peripheral cam surface, so that a relative rotation between said seat body and said base, with said abutting plate abutting and relatively moving along said peripheral cam surface, will cause a relative sliding displacement between said seat body and said base.

2. The child safety seat according to claim 1, wherein said cam shape of said peripheral cam surface is a square shape with rounded corners.

3. A child safety seat adapted to be arranged on a vehicle seat in a vehicle and to be secured to the vehicle seat by a seat belt of the vehicle, said child safety seat comprising:

a base adapted to be supported on the vehicle seat and to be secured to the vehicle seat by the seat belt;

a seat body adapted to have a child seated therein, wherein said seat body is rotatably and slidably mounted on said base; and means for sliding said seat body in a linear direction relative to said base in response to manual rotation of said seat body relative to said base, wherein said means comprise a cam plate that has a peripheral cam surface and that is secured to a bottom of said seat body, and an abutting plate that abuts against said peripheral cam surface of said cam plate and that is secured to said base.

4. The child safety seat according to claim 3, wherein a cam shape of said peripheral cam surface is a square shape with rounded corners.

5. A child safety seat adapted to be arranged on a vehicle seat in a vehicle, and having a base portion adapted to be secured to the vehicle seat by a seat belt of the vehicle seat, and a support portion that forms a support space for receiving a child and that is rotatably supported by said base portion, further comprising:

a rotation sliding mechanism, including a cam plate that has a peripheral cam surface and that is secured to a bottom of said support portion, and an abutting plate that is secured to said base portion and that is abutted against said peripheral cam surface of said cam plate for sliding said support portion in forward and backward directions of said base portion in response to rotation of said support portion.

6. The child safety seat according to claim 5, wherein a cam shape of said peripheral cam surface is a square shape with rounded corners.

7. The child safety seat according to claim 5, wherein said rotation sliding mechanism further includes a guide frame provided in said base portion for slidably guiding said support portion in the forward and backward directions, and said peripheral cam surface of said cam plate has a rectangular outer surface shape.

8. The child safety seat according to claim 5, further comprising biasing means for applying to said support portion a force toward a back side of said base portion, said biasing means being provided between said base portion and said support portion.

* * * * *

UNITED STATES PATENT AND TRADEMARK OFFICE
CERTIFICATE OF CORRECTION

PATENT NO. : 6,520,579 B2                                       Page 1 of 1
DATED     : February 18, 2003
INVENTOR(S) : Kassai et al.

It is certified that error appears in the above-identified patent and that said Letters Patent is hereby corrected as shown below:

Column 3,
Line 45, after "by", replace "900" by -- 90° --.

Column 4,
Line 41, after "enabled.", delete "shape R1,".
Replace lines 42 and 43, to read as follows:
-- Here, to facilitate insertion of locking pin 702 into locking hole 403b, the leading edge of locking pin 702 is preferably molded to have a curved shape R1, and the upper end portion of locking hole 403b preferably has a taper T1. --.

Signed and Sealed this

Twenty-fourth Day of June, 2003

JAMES E. ROGAN
*Director of the United States Patent and Trademark Office*